United States Patent
Mueller et al.

(10) Patent No.: US 11,821,511 B2
(45) Date of Patent: Nov. 21, 2023

(54) ELECTRONIC MONITORING SYSTEM FOR HYDROSTATIC TRAVEL DRIVES AND TRAVEL DRIVE WITH ELECTRONIC MONITORING SYSTEM

(71) Applicant: Robert Bosch GmbH, Stuttgart (DE)

(72) Inventors: Matthias Mueller, Langenau (DE); Heinz Hense, Neu-Ulm (DE); Juergen Feig, Bibertal (DE); Peer Mumcu, Ulm (DE); Ronny Herrmann, Neu-Ulm (DE); Veronica Arenas, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 590 days.

(21) Appl. No.: 17/052,008

(22) PCT Filed: Apr. 15, 2019

(86) PCT No.: PCT/EP2019/059694
§ 371 (c)(1),
(2) Date: Oct. 30, 2020

(87) PCT Pub. No.: WO2019/211088
PCT Pub. Date: Nov. 7, 2019

(65) Prior Publication Data
US 2021/0372522 A1     Dec. 2, 2021

(30) Foreign Application Priority Data
May 4, 2018    (DE) .................... 10 2018 206 908.5

(51) Int. Cl.
*F16H 61/4192*      (2010.01)
*F16H 61/431*       (2010.01)
(Continued)

(52) U.S. Cl.
CPC ....... *F16H 61/4192* (2013.01); *F16H 61/431* (2013.01); *G01L 19/0038* (2013.01);
(Continued)

(58) Field of Classification Search
CPC .............. F16H 61/4192; F16H 61/431; F16H 2059/6861; F16H 2059/6876; G01L 19/0038; G01P 3/44
See application file for complete search history.

(56) References Cited

U.S. PATENT DOCUMENTS

| 7,841,442 B2* | 11/2010 | Berg ..................... B60W 10/04 180/170 |
| 2004/0060206 A1* | 4/2004 | Ichimura ............... F15B 19/005 37/348 |

FOREIGN PATENT DOCUMENTS

| DE | 103 03 206 A1 | 7/2004 |
| DE | 10 2005 009 929 A1 | 9/2006 |

(Continued)

OTHER PUBLICATIONS

International Search Report corresponding to PCT Application No. PCT/EP2019/059694, dated Oct. 28, 2019 (German and English language document) (5 pages).

*Primary Examiner* — John D Walters
(74) *Attorney, Agent, or Firm* — Maginot, Moore & Beck LLP

(57) ABSTRACT

A monitoring system for a travel drive includes a rotational speed sensor of a hydrostatic motor. The rotational speed sensor is configured to determine acceleration. At least one signal from a pressure sensor mounted on at least one working line that connects a pump to the hydrostatic motor of a hydrostatic travel drive is evaluated. The pressure sensor is preferably arranged on at least one working connection of the pump. The system uses the additional pressure signal to evaluate in a reliable manner whether the hydrostatic travel drive generates an unwanted drive torque.

10 Claims, 1 Drawing Sheet

(51) Int. Cl.
*G01P 3/44* (2006.01)
*G01L 19/00* (2006.01)
*F16H 59/68* (2006.01)

(52) U.S. Cl.
CPC ........ *G01P 3/44* (2013.01); *F16H 2059/6861* (2013.01); *F16H 2059/6876* (2013.01)

(56) References Cited

FOREIGN PATENT DOCUMENTS

DE  10 2008 021 313 A1  8/2009
DE  10 2015 209 333 A1  11/2016

* cited by examiner

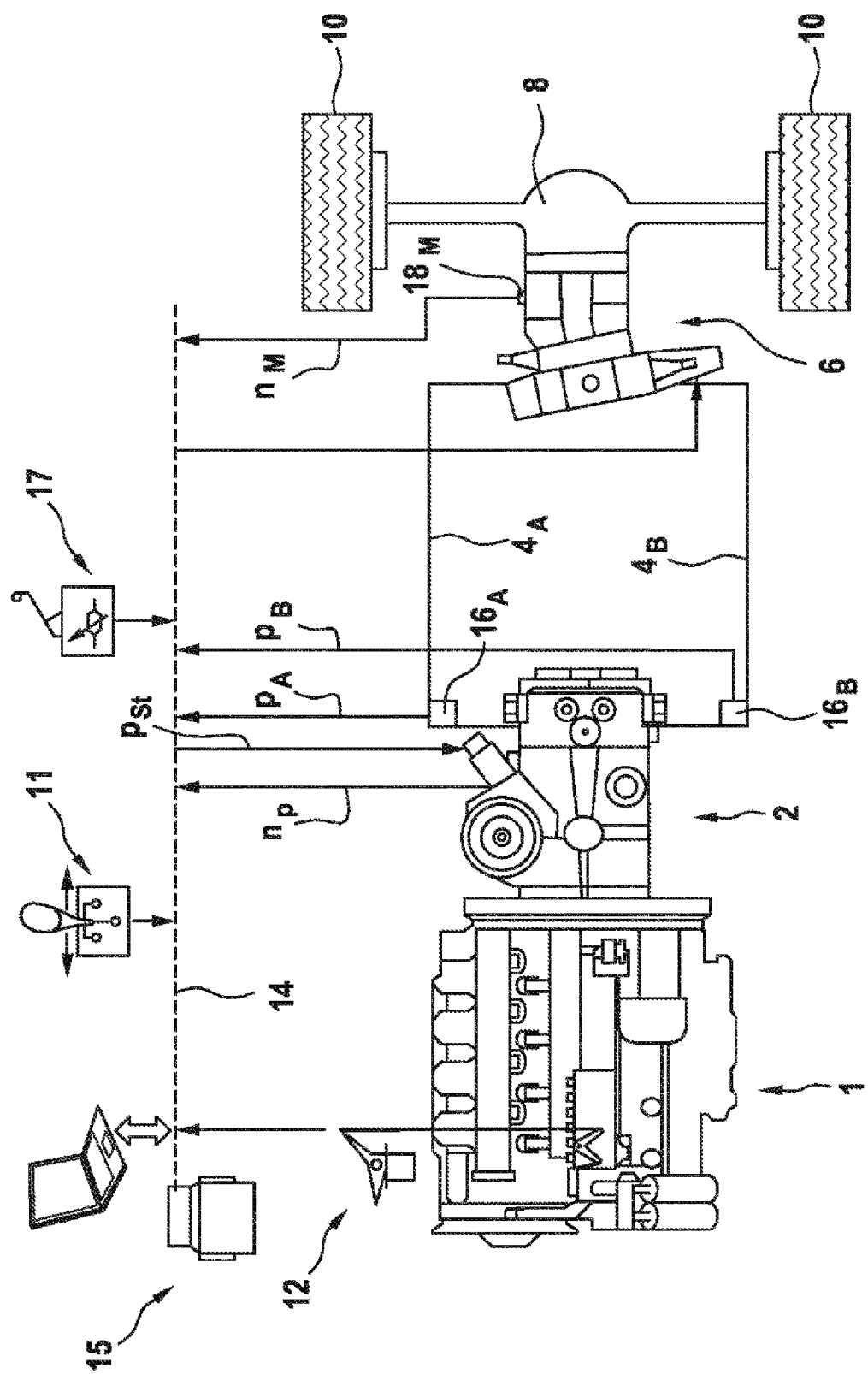

ELECTRONIC MONITORING SYSTEM FOR HYDROSTATIC TRAVEL DRIVES AND TRAVEL DRIVE WITH ELECTRONIC MONITORING SYSTEM

This application is a 35 U.S.C. § 371 National Stage Application of PCT/EP2019/059694, filed on Apr. 15, 2019, which claims the benefit of priority to Serial No. DE 10 2018 206 908.5, filed on May 4, 2018 in Germany, the disclosures of which are incorporated herein by reference in their entirety.

The present disclosure concerns an electronic monitoring system for hydrostatic travel drives for vehicles for the realization of safety functions and a corresponding travel drive.

BACKGROUND

DE 10 2008 021 313 A1 discloses a hydraulic component control unit and a method for controlling hydraulic components such as travel drives of mobile working machines. In doing so, a control function and a monitoring function monitor each other.

From the prior art, electronic monitoring systems are also known in which the hydrostatic travel drive involved is monitored by means of the revolution rate signal of the hydrostatic motor to implement safety functions. Also, travel drives are known in which the control current for the hydrostatic pump is monitored. Related monitoring concepts are known in the automotive sector as the "EGAS monitoring concept" or "3-level concept".

For the standardized safety function "safe standstill", which can also be described as a safe no-drive state, driver inputs are evaluated, for example the gas pedal position and the chosen direction of travel. After the driver requests standstill or no drive when the vehicle is stationary, for example by releasing the gas pedal or by choosing "neutral" as the direction of travel, the hydrostatic drive must not generate an active drive torque, so that the vehicle does not start unintentionally.

With the above-mentioned solution, only the revolution rate signal of the hydrostatic motor is used for monitoring. With this signal, however, it is not possible to distinguish whether the vehicle moves unintentionally because the hydrostatic drive generates an active drive torque, which is recognized as an error state, or whether the vehicle moves only on the basis of external forces such as the slope downforce or the inertia, which does not represent an error state. This means that the detection of fault states in monitoring systems from the prior art is restricted and can only be used sensibly for certain vehicle types (for example a municipal vehicle with a parking brake). Moreover, its use for very dynamic vehicles, such as wheel loaders in aggregate material, is not possible since fault states and non-fault states cannot be distinguished.

SUMMARY

The disclosure improves the electronic monitoring system of a travel drive to the extent that it reliably and robustly detects fault states even in previously problematic driving situations, for example when rolling away on an incline and in dynamic driving maneuvers of vehicles, for example when wheel loaders are rolling out.

The claimed electronic monitoring system is designed to provide monitoring of a hydrostatic travel drive of a vehicle. The hydrostatic travel drive has a control element by means of which a standstill signal or a no-drive signal can be transmitted to an electronic control unit of the monitoring system. The travel drive also has a hydrostatic pump and a hydrostatic motor. The monitoring system has a revolution rate sensor for the direct or indirect detection of a motor revolution rate, from which according to the disclosure an acceleration of the motor and/or the vehicle can be detected by means of the control unit. According to the disclosure the monitoring system also has at least a first pressure sensor, by means of which a first pressure signal of a first working line of the travel drive can be transmitted to the control unit. Thus, a drive state and/or a no-drive state of the affected travel drive can be detected. The drive state can also be described as an active state and the no-drive state as a passive state of the travel drive. This improves the electronic monitoring system from the prior art in such a way that it reliably and robustly detects fault states even in previously problematic driving situations, for example when rolling away on an incline and with dynamic driving maneuvers of the affected vehicle, for example when wheel loaders roll out.

Assuming the driver brings the vehicle to a standstill on a steep slope and continues to demand standstill or no drive; if the vehicle is set in motion again by the slope downforce, the monitoring system according to the disclosure can, on the basis of the significant acceleration and the non-significant pressure signal of the working line serving as a feed to the motor, detect that there is no fault in the hydrostatic travel drive because it does not cause the movement of the vehicle. Previous solutions can only be used if a parking brake prevents such situations.

With the previous solution, in which the control current for the hydrostatic pump is monitored, there is the disadvantage that it cannot detect faults that lie outside the electronic control system, i.e. in the control unit of the pump. By the monitoring system according to the disclosure, fault states can also be detected which are caused by faults outside the electronic control system.

Also a defect within the pump control system, which causes the pump to rotate and generate an unintentional drive torque, can be detected by the evaluation of the at least one pressure sensor, since in this case a significant pressure signal of the working line serving as a feed to the motor is detected. In the previous solution, in which only the control currents were monitored, such errors could not be detected.

As mentioned above, the revolution rate of the motor can also be recorded indirectly by the revolution rate sensor. This is the case, for example, if a mechanical manual transmission is also installed between the hydrostatic motor and a differential gearbox. For example, there are often two mechanical gears, a transport gear (fast) and a working gear (slow), between which switching can be carried out when at a standstill (standstill manual gearbox). However, there are also mechanical gearboxes that can be used to shift during the journey (for example "shift-on-the-fly" gearbox). The revolution rate sensor can then also be installed on the output shaft of the manual gearbox or in the gearbox. Although the revolution rate sensor does not measure the revolution rate of the hydrostatic motor, but for example the gearbox output revolution rate, the disclosure still works the same way when the motor revolution rate is replaced with the gearbox output revolution rate.

Moreover, two hydrostatic motors with a mechanical summation gearbox can also be connected together ("2+1 summation gearbox"). The revolution rate sensor can also be installed on the output shaft of the manual gearbox or in the gearbox here. The disclosure is also applicable here if the gearbox output revolution rate is used instead of the motor revolution rate. The two hydrostatic motors with the summation gearbox can be effectively treated as a single hydrostatic motor.

Finally, there are also variants in which the hydrostatic motors are installed directly on the wheel of the vehicle. In principle, only the axle gearbox is eliminated here.

In a particularly preferred further development, the monitoring system according to the disclosure has a second pressure sensor, by means of which a second pressure signal of a second working line can be transmitted to the control unit. Thus, with the monitoring system according to the disclosure a bidirectional travel drive with a closed hydraulic circuit can be monitored. The monitoring system can determine that the second working line is under significant pressure, and thus can also detect active reversing of the travel drive to be monitored. If the driver demands a standstill or no drive by means of the control element in this case, the fault is detected.

Preferably, a forward signal and a reverse signal can be transmitted from the control element to the electronic control unit. Then, with the second pressure sensor on the second working line, active reversing can also be detected in the case of a forward signal of the control element or active forward driving can be detected in the case of a reversing signal of the control element. Thus, the monitoring system according to the disclosure also has a "Safe Direction" and a "Safe Reversing" function.

The claimed hydrostatic travel drive for a vehicle has a control element by means of which a standstill signal or a no-drive signal can be transmitted to an electronic control unit of an electronic monitoring system. The travel drive has a hydrostatic pump and a hydrostatic motor. The monitoring system has a revolution rate sensor for detecting a motor revolution rate, from which according to the disclosure an acceleration of the motor and/or the vehicle can be detected by means of the control unit. According to the disclosure, the monitoring system has a first pressure sensor, by means of which a first pressure signal of a first working line of the travel drive can be transmitted to the control unit. Thus, a drive state and/or a no-drive state of the travel drive can be detected. The drive state can also be described as an active state and the no-drive state as a passive state of the travel drive according to the disclosure. The advantages of the travel drive according to the disclosure correspond to those of the monitoring system described above.

In a particularly preferred bidirectional development, the travel drive according to the disclosure has a closed hydraulic circuit with a second working line. Then the monitoring system has a second pressure sensor, by means of which a second pressure signal of the second working line can be transmitted to the control unit. This means that the monitoring system is bidirectional, and can determine that the second working line is under significant pressure and can thus detect for example active reversing of the travel drive according to the disclosure. If the driver demands a standstill or no drive by means of the control element, the fault is detected.

With the monitoring system according to the disclosure and with the travel drive according to the disclosure, a pressure difference between the first and the second pressure signals can preferably be detected by the control unit. Then a fault can be detected by the control unit if the standstill signal or the no-drive signal is transmitted to the control unit from the operating unit and if the following three conditions are additionally met:

the motor revolution rate is greater than zero, from which forward driving is concluded, and the pressure difference is greater than or equal to a reference value for the pressure difference, and the acceleration (of the motor or vehicle) is greater than a reference value for the acceleration.

With the monitoring system according to the disclosure and with the travel drive according to the disclosure, a fault can also be detected if the standstill signal or the no-drive signal is transmitted from the operating unit to the control unit, and if additionally the following three conditions are met:

the motor revolution rate is less than zero, from which reversing can be inferred, and the pressure difference is less than or equal to the reference value mentioned above, but negative, for the pressure difference, and the acceleration is less than the reference value reference value mentioned above, but negative, for the acceleration.

With the monitoring system according to the disclosure and with the travel drive according to the disclosure, the control element from which the standstill signal or the no-drive signal is transmitted to the control unit is for example a direction lever in a neutral position or a gas pedal in a zero position or an inch pedal in a maximum position.

With the monitoring system according to the disclosure and with the travel drive according to the disclosure, the pump may be an ET pump. Then a non-stiff and non-pedal-controlled control of the ET pump by means of a control pressure is preferred. Other types of control are also possible, such as an EP pump.

BRIEF DESCRIPTION OF THE DRAWING

The FIGURE is a block diagram of a travel drive as disclosed herein.

DETAILED DESCRIPTION

The FIGURE shows an exemplary embodiment of the travel drive according to the disclosure for a mobile working machine, which can be, for example, a wheel loader. The mobile working machine has a diesel engine 1, to the crankshaft of which (not shown in detail) is coupled an axial piston pump 2 with an adjustable stroke volume. This supplies in a closed circuit via two working lines $4_A$, $4_B$ a motor 6, the output shaft of which is coupled to two wheels 10 via a differential gearbox 8. The pump 2, the two working lines $4_A$, $4_B$ and the motor 6 are the travel drive according to the disclosure.

A gas pedal 12 is mechanically coupled to the diesel motor 1 in the exemplary embodiment shown.

Furthermore, the travel drive according to the disclosure has a central data line 14, to which an electronic control unit 15 is connected. Position data or position signals of the gas pedal 12, a direction lever 11 and an inch pedal 17 are transmitted via the central data line 14. The inch pedal 17 is used by users of the mobile working machine for preference compared to the travel drive.

Furthermore, pressure signals of a first pressure sensor $16_A$ and a second pressure sensor $16_B$ are transmitted to the control unit 15 via the central data line 14. The two pressure sensors $16_A$, $16_B$ are connected to the two main ports of the pump 2 and record the working pressure of the respective working line $4_A$, $4_B$.

Furthermore, a pump revolution rate np from a (not shown) revolution rate sensor and a motor revolution rate $n_m$ from a revolution rate sensor $18_M$ are transmitted to the control unit 15.

A control pressure signal $P_{St}$ is transmitted from the control unit 15 via the central data line 14, wherein the pump 2 is in the form of an ET pump.

In a preferred alternative exemplary embodiment, the pump 2 is not controlled via the central data line 14, but via two separate electrical lines (not shown in detail), by means of which two control current signals for solenoid valves of the pump 2 are transmitted.

As an example, the safety function "safe standstill" or safe no-drive of the exemplary embodiment shown of the travel drive according to the disclosure is described. The safety function prevents unintentional active acceleration of the mobile working machine by the driver with the travel drive.

The following driver control elements are evaluated by the control unit 15:
 Direction of travel lever 11,
 Gas pedal 12 and
 Inch pedal 17.

The driver demands standstill or no drive if at least one of the following conditions is met:
 Direction of travel lever 11 is in "neutral" position,
 Gas Pedal 12 is in zero position or
 Inch pedal 17 is in maximum position.

Other control elements such as a creep potentiometer and their evaluation are also possible.

In particular then the following sensors are evaluated:
 Revolution rate sensor $18_M$ on the hydrostatic motor 6 (motor revolution rate symbol: $n_M$),
 First pressure sensor $16_A$ on the hydrostatic pump 2 or on the first working line $4_A$ (symbol for the first pressure: $p_A$) and
 Second pressure sensor $16_B$ on the hydrostatic pump 2 or on the second working line $4_B$ (symbol for the second pressure: $p_B$).

The acceleration a is calculated numerically from the revolution rate signal $n_M$. More specifically, the angular acceleration of the motor 6 is determined and the acceleration of the mobile working machine may be calculated numerically from this. The pressure difference $\Delta p$ is formed from the two pressure signals $p_A$ and $p_B$.

The pressure difference $\Delta p$ is always calculated by convention in such a way that a positive pressure difference $\Delta p$ means an active drive torque in the forward direction. This is important for the formulation of the error condition for the pressure difference $\Delta p$. Depending on the installation position of the pressure sensors $16_A$, $16_B$ and the hose of the hydrostatic drive, $\Delta p = p_A - P_B$ or $\Delta_p = P_B - P_A$.

If the driver demands a standstill or no drive by means of one of the above-mentioned control elements, and one of the following two conditions is met, then there is an error that is detected by the monitoring system according to the disclosure.

1. ($n_M$>0) and ($\Delta p >= \Delta p_{Ref}$) and (a>−$a_{Ref}$)
2. ($n_M$<0) and ($\Delta p <= -\Delta p_{Ref}$) and (a<$a_{Ref}$)

$\Delta p_{Ref}$ and $a_{Ref}$ are reference values for pressure difference and acceleration that can also be time-dependent. The first condition means that the mobile working machine is moving forwards and there is a significant or excessive pressure difference $\Delta p$ (relative to the reference value $\Delta p_{Ref}$) from which a significant or excessive forward driving torque (relative to the reference value) results, with the forward acceleration a being significant or excessive (relative to the reference value −$a_{Ref}$).

In the case of the bidirectional drive with a closed circuit shown in the FIGURE, the second condition applies analogously to reversing. The second condition therefore means that the mobile working machine is reversing, and there is a significant or excessive pressure difference $\Delta p$ (relative to the reference value −$\Delta p_{Ref}$). This will result in a significant or excessive rearward driving torque (relative to the reference value). The rearward acceleration a is significant or excessive (relative to the reference value $a_{Ref}$).

When the error is detected in this way by the monitoring system, the electronic control unit 15 switches off all electrical outputs in order to finally switch off the travel drive and bring the mobile working machine into a safe state.

A monitoring system for a travel drive and a travel drive with a monitoring system are disclosed. An acceleration is determined by means of a revolution rate sensor of a hydrostatic motor, and additionally at least one pressure sensor is evaluated, which is installed on the at least one working line that connects the pump to the motor of the hydrostatic travel drive. Preferably, the pressure sensor is arranged on the at least one working port of the pump. Using the additional pressure signal, it can be evaluated whether the hydrostatic drive motor generates an unintentional driving torque or not.

The invention claimed is:

1. An electronic monitoring system for a hydrostatic drive that has a control element for transmitting a standstill signal or a no-drive signal, a hydrostatic pump, and a hydrostatic motor, the electronic monitoring system comprising:
 an electronic control unit configured to receive the standstill signal and/or the no-drive signal;
 a revolution rate sensor operably connected to the electronic control unit and configured to detect a motor revolution rate; and
 a first pressure sensor operably connected to the electronic control unit,
 wherein the electronic control unit is configured to detect an acceleration of the hydrostatic motor from the motor revolution rate, and
 wherein the first pressure sensor is configured to transmit a first pressure of a first working line of the hydrostatic drive to the electronic control unit, with which the electronic control unit is configured to determine a drive state and/or a no-drive state of the hydrostatic drive.

2. The electronic monitoring system as claimed in claim 1 further comprising:
 a second pressure sensor operably connected to the electronic control unit and configured to transmit a second pressure of a second working line to the electronic control unit.

3. The electronic monitoring system as claimed in claim 2, wherein:
 the electronic control unit is configured to determine a pressure difference between the first pressure and the second pressure, and
 the electronic control unit is configured to determine an error (i) when the standstill signal or the no-drive signal is transmitted to the electronic control unit, and (ii) when additionally the following three conditions are met:
  a motor revolution rate>0,
  the pressure difference>=a reference value for the pressure difference, and
  the acceleration>a negative reference value for the acceleration.

4. The electronic monitoring system as claimed in claim 2, wherein:
the electronic control unit is configured to determine a pressure difference between the first pressure and the second pressure, and
the electronic control unit is configured to detect an error (i) when the standstill signal or the no-drive signal is transmitted to the electronic control unit from an operating unit, and (ii) when the following three conditions are also met:
a motor revolution rate<0,
the pressure difference<=a negative reference value for the pressure difference, and
the acceleration<a reference value for the acceleration.

5. A hydrostatic travel drive comprising:
an electronic monitoring system including an electronic control unit, a revolution rate sensor, and a first pressure sensor;
a control element operably connected to the electronic monitoring system and configured to transmit a standstill signal or a no-drive signal to the electronic control unit of the electronic monitoring system;
a hydrostatic pump; and
a hydrostatic motor,
wherein the revolution rate sensor is configured to detect a motor revolution rate,
wherein the electronic control unit is configured to detect an acceleration of the hydrostatic motor from the motor revolution rate, and
wherein the first pressure sensor is configured to transmit a first pressure of a first working line of the hydrostatic travel drive to the electronic control unit, whereby a drive state and/or a no-drive state of the hydrostatic travel drive is determined.

6. The hydrostatic travel drive as claimed in claim 5, further comprising:
a closed circuit with a second working line,
wherein the electronic monitoring system has a second pressure sensor configured to transmit a second pressure of the second working line to the electronic control unit.

7. The hydrostatic travel drive as claimed in claim 6, wherein:
the electronic control unit is configured to determine a pressure difference between the first pressure and the second pressure, and
the electronic control unit is configured to detect an error (i) when the standstill signal or the no-drive signal is detected by the electronic control unit, and (ii) when the following three conditions are also met:
the motor revolution rate>0,
the pressure difference>=a reference value for the pressure different, and
the acceleration>a negative reference value for the acceleration.

8. The hydrostatic travel drive as claimed in claim 6, wherein:
the electronic control unit is configured to determine a pressure difference between the first pressure and the second pressure, and
the electronic control unit is configured to detect an error (i) when the standstill signal or the no-drive signal is transmitted from an operating unit to the electronic control unit of the monitoring system, and (ii) when additionally the following three conditions are met:
the motor revolution rate<0,
the pressure difference<=a negative reference value for the pressure difference, and
the acceleration<a reference value for the acceleration.

9. The hydrostatic travel drive as claimed in claim 5, wherein:
the electronic control element is a direction of travel lever in a neutral position,
the electronic control element is a gas pedal in a zero position, or
the electronic control element is an inch pedal in a maximum position.

10. The hydrostatic travel drive according to claim 5, wherein:
the hydrostatic pump is an ET pump, and non-stiff and non-pedal-driven control of the ET pump is provided via a control pressure.

* * * * *